United States Patent [19]

Sues et al.

[11] Patent Number: 4,872,198

[45] Date of Patent: Oct. 3, 1989

[54] TRANSIENT SIGNAL ELIMINATION CIRCUIT FOR TELECOMMUNICATIONS APPLICATIONS

[75] Inventors: John M. Sues; Jing H. Sun, both of New York, N.Y.

[73] Assignee: The Intleplex Corp., Paramus, N.J.

[21] Appl. No.: 231,494

[22] Filed: Aug. 12, 1988

[51] Int. Cl.$^4$ ........................................... H04M 11/06
[52] U.S. Cl. .................................. 379/377; 379/106; 379/39; 370/110.1
[58] Field of Search ...................... 379/90, 93, 94, 106, 379/107, 109, 351, 353, 377, 386, 399, 412, 414, 416, 40, 39; 370/110.1

[56] References Cited

U.S. PATENT DOCUMENTS

| | | | |
|---|---|---|---|
| 4,086,234 | 4/1978 | Bocchi | 379/107 X |
| 4,493,948 | 1/1985 | Sues et al. | 379/42 |
| 4,528,422 | 7/1985 | Cupani | 379/42 X |
| 4,665,516 | 5/1987 | Middleton et al. | 379/107 X |

Primary Examiner—James L. Dwyer
Attorney, Agent, or Firm—Lieberman, Rudolph & Nowak

[57] ABSTRACT

Transient signal elimination circuitry is disposed in a local communications loop extending from a subscriber telephone to a telephone central office couples ringing and on-hook and off-hook signals through the loop after removing transients in these signals. The circuitry also isolates the telephone subscriber and central office from the local loop until and off-hook signal is detected and restores this isolation when an on-hook condition exits at the telephone subscriber. In this manner, the local loop can be simultaneously used for both voice communications and a second information signal with each signal capable of occupying the same bandwidth. These signals can operate independently of each other.

15 Claims, 4 Drawing Sheets

TRANSIENT SIGNAL ELIMINATION CIRCUIT FOR TELECOMMUNICATIONS APPLICATIONS

TECHNICAL FIELD

The present invention relates to the field of information transfer and, more particularly to, a transient signal elimination circuit which removes spurious transient signals from a telephone local loop in a manner which allows the simultaneous use of that loop for both normal voice communications and a second information signal.

BACKGROUND OF THE INVENTION

The number of worldwide telephone subscribers is substantial and is rapidly increasing. Each such subscriber is generally connected to a telephone central office via a metallic pair of wires referred to as the telephone "local loop." This huge network of communications paths is grossly under utilized as it is normally used only for sporadic voice communications between telephone subscribers via one or more telephone central offices. In addition, there is a burgeoning demand for data access to telephone subscribers in order to provide such services as interactive television viewing, at-home shopping and banking services, monitoring alarm conditions in the home or office, and a host of other applications in which it is necessary to transmit data to, and receive data from, the telephone subscriber. The known under utilization of the telephone local loop network, and the growing demand for access to the telephone subscriber, has sparked a search for means to utilize the telephone local loop for information transfer, while leaving the underlying voice communications undisturbed.

Systems now exist which permit the simultaneous transmission of both voice and a secondary information signal over the local loop. One such system is described in U.S. Pat. Nos. 4,493,948 and 4,528,422, assigned to The Interplex Corporation, the present assignee. Such systems generally comprise an information terminal coupled to the ring and tip conductors of the local loop at a first location, such as the location of the telephone subscriber, and a companion information terminal also coupled to the ring and tip conductors at a second location, such as the telephone central office. The information terminals are designed to transmit complementary signals, in both amplitude and phase, on the ring and tip conductors between a respective conductor and earth ground. These signals are carefully balanced longitudinally between the tip and ring conductors and, when precisely balanced, the signals will not disturb the normal underlying voice communications. It is, of course, understood that voice communications is not disturbed because the telephone equipment works on the principal of detecting a difference in voltage and/or phase between the signals on the tip and ring conductors. As a result, perfectly balanced signals are essentially invisible to the telephone equipment.

Systems like those described in the above-referenced two U.S. patents provide excellent service in permitting a secondary information signal to be superimposed over normal voice communications carried on the local loop. However, in order for such systems to operate properly, perfect signal balance must be maintained between the tip and ring conductors at all times.

A problem arises in maintaining balanced signals when transmitting over metallic tip and ring conductors of the local loop. Factors such as differences in tip and ring conductor lengths, differences in manufacturing tolerances, and various environmental conditions can change the impedance of either of the conductors. Any change in impedance, even a very small one, results in unbalanced longitudinal signals, i.e., differences exists between amplitude and phase of such signals. Such differences, in turn, result in unwanted interference (cross-talk) with voice communications being carried over the local loop.

Previous solutions to this problem have included the use of manually adjustable potentiometers within the local loop that require periodic adjustment by a technician. However, the maintenance expenses alone associated with a circuit requiring such manual adjustment would render it impractical to use this technique widely, such as in conjunction with the existing telephone network.

Most recently, in a pending application entitled "Automatic Balancing Circuit for Longitudinal Transmission System", apparatus is disclosed which automatically provides phase and amplitude balancing of two signals coupled on the local loop. One signal is carried between a ring conductor and ground while the second is carried between a tip conductor and ground. While this technique allows two signals to be simultaneously coupled on the local loop at the same time, transient signals occur on the loop which interfere with such simultaneous transmission despite the fact that the two signals are balanced. One such transient occurs during the on-hook to off-hook signal supplied by a subscriber telephone to a central office while the other appears at varying times during the duration of the ringing signal coupled from the central office to the subscriber telephone. It would, therefore, be extremely desirable to eliminate the information loss due to the existence of such transients in a manner which is compatibility with the operation of the existing voice communications network and which permits simultaneous use of the local loop for voice communications and another information signal.

SUMMARY OF THE INVENTION

Broadly speaking, the present invention eliminates undesirable transient signals in a local loop which interfere with the simultaneous use of the loop for the transmission of two balanced signals representing different information. In addition, the signals in which the transients appear are coupled through the elimination circuitry to the local loop. The invention also provides isolation of a subscriber telephone from the local loop until after an off-hook condition is detected at a subscriber telephone. This isolation is restored when an on-hook condition is detected at the subscriber telephone. A feature of this technique is that it is transparent to normal voice communications and is compatible with circuitry which allows a second information signal to be superimposed on a voice signal so that a local communications loop can be simultaneously used for both voice and the second information signal.

DETAILED DESCRIPTION

Figure 1:
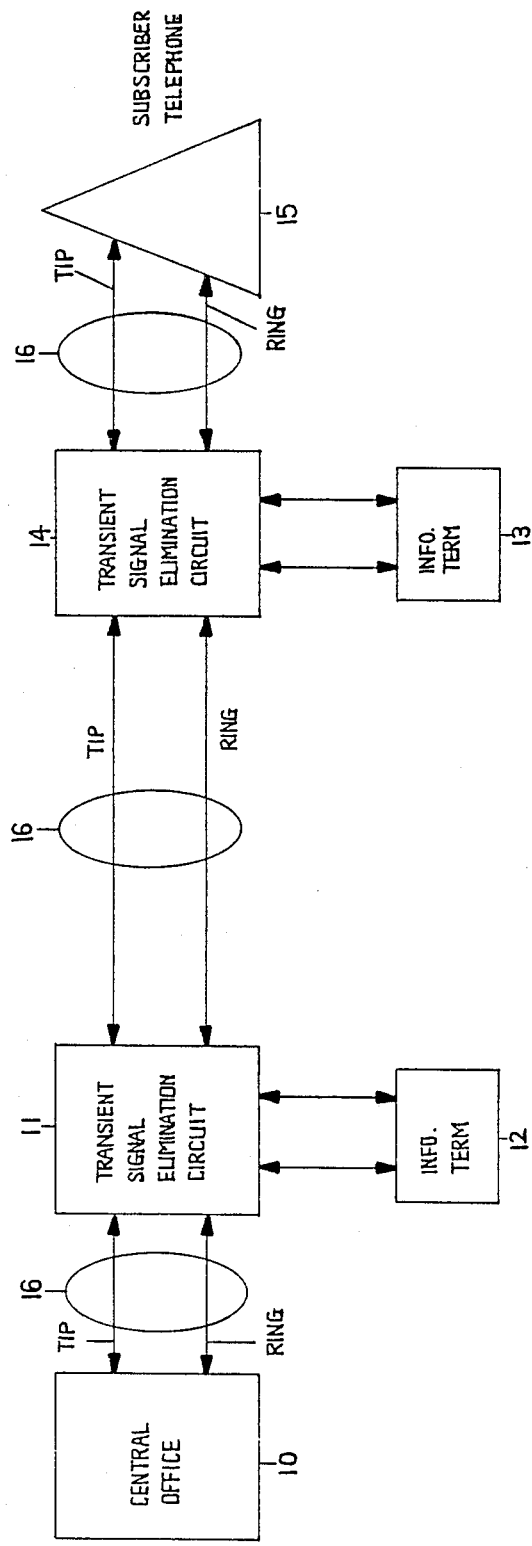
FIG. 1 is a block diagram representation of the manner in which the present invention is utilized in conjunction with an existing telephone network.

FIG. 1 shows an illustrative application of the present invention wherein a secondary information transfer system is connected to a conventional local loop of the telephone system to transfer a second information signal without disturbing simultaneous normal voice communications. It should, of course, be understood that the information carried by this second information signal can take many forms, such as voice, data, facsimile, etc. and this signal can occupy the entire voice bandwidth which extends from approximately 300 to 3400 Hz. The transfer system includes transient signal elimination circuits 11 and 14 and information terminals 12 and 13. Each of circuits 11 and 14 advantageously incorporates an automatic balancing circuit which is the subject of a copending application entitled "Automatic Balancing Circuit For Longitudinal Transmission System" and assigned to the present assignee along with the circuitry disclosed in U.S. Pat. Nos. 4,493,948 and 4,528,422. This application and the cited patents are hereby incorporated by reference herein.

As illustrated, transient signal elimination circuits 11 and 14 are connected in series with loop 16 which extends from telephone central office 10 to subscriber telephone set 15. Loop 16 is a conventional 2-wire conductor having a tip and a ring lead and may be of any length and impedance such as is permissible in a conventional telephone network. Information terminals 12 and 13 are also connected to loop 16 between circuits 11 and 14 via interface circuitry advantageously incorporated within transient elimination circuits 11 and 14. Of course, it should be understood that appropriate equipment could be provided at the telephone central office to transmit information received from information terminal 12 to any desired location and to forward information to terminal 12.

As will be described hereinbelow, circuits 11 and 14 permit the use of loop 16 for information transfer between terminals 12 and 13 at the same time that voice communication is occurring between central office 10 and subscriber telephone 15. The automatic balancing circuits within transient signal elimination circuits 11 and 14 provide phase and amplitude balancing of the voice and data signals on loop 16. When such balancing is provided, there is no phase or amplitude difference between the data and voice signals conducted by loop 16.

Even when phase and amplitude balancing are provided, such as is described in the above-cited copending patent application, transient signals exist in the telephone network. One such transient signal is the ringing signal provided from the telephone central office and the other is the on-hook to off-hook signal from a subscriber telephone. Both the ringing and subscriber telephone signals include a spike or surge which causes information loss even when the second information and normal voice signals are balanced. Furthermore, the surge in the ringing signal can occur at any time during the ringing signal. The existence of these interfering spikes or surges are not troublesome for normal voice communications as one is not talking during the period the ringing and on-hook to off-hook signals are present but they can cause information loss if information transfer and voice communications simultaneously occur in the same bandwidth. The function of transient signal elimination circuits 11 and 14 is to eliminate the troublesome transients present in the ringing and on-hook to off-hook signals while not interfering with the function of these signals for normal voice communications.

Figure 2:
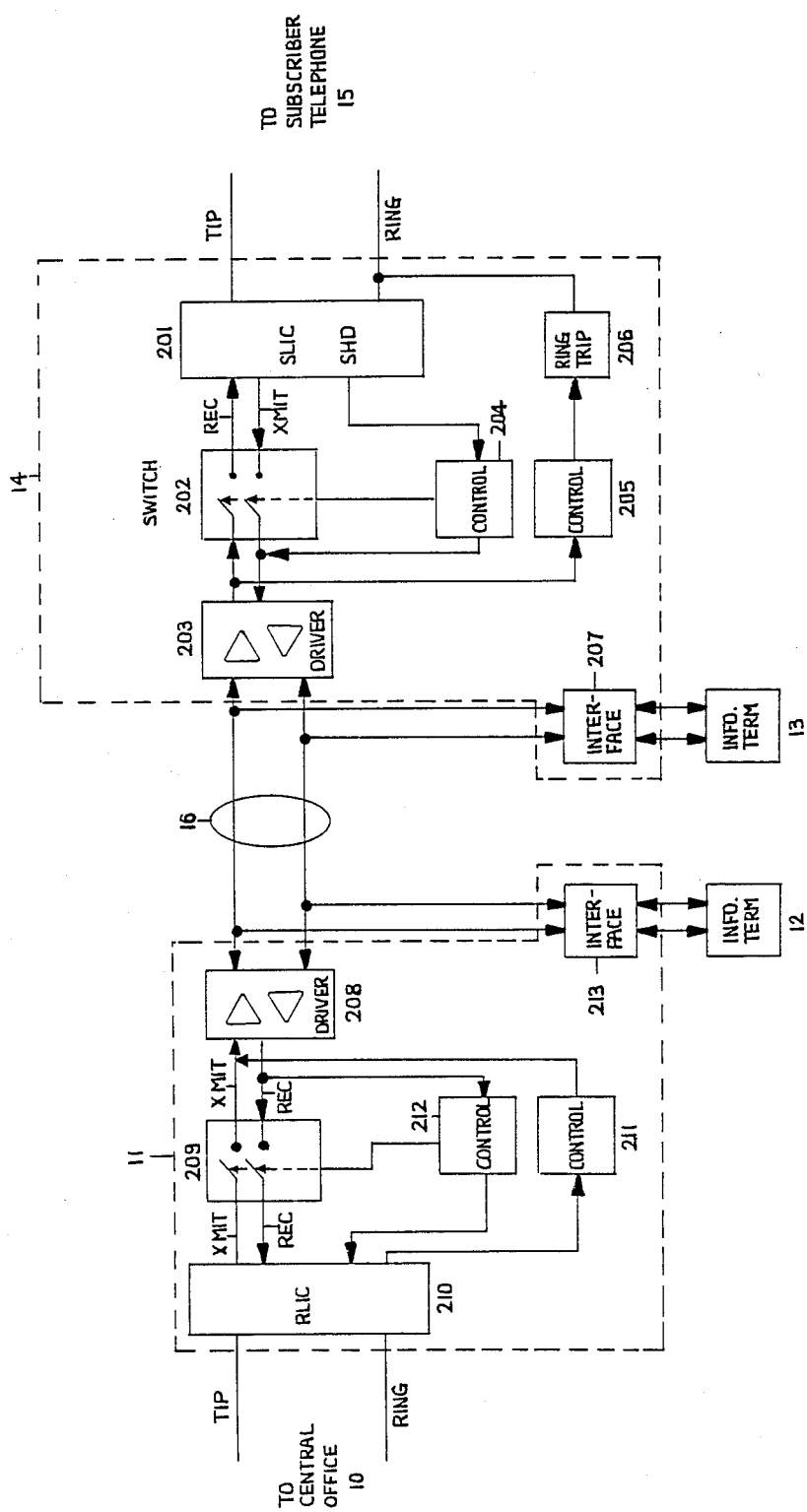
FIG. 2 is a block diagram representation of the present invention which depicts the various circuit elements of the transient signal elimination circuits 11 and 14 of FIG. 1.

Refer now to FIG. 2. The tip and ring conductors from subscriber telephone 15 are serially connected to transient signal elimination circuit 14. Circuit 14 includes subscriber line interface circuit (SLIC) 201, switch 202, driver 203, control units 204 and 205, ring trip generator 206, and interface 207. SLIC 201 is a well-known two to four wire telephone interface which provides the functions necessary to supervise signalling and audio transmission between a switching system and a subscriber loop. Commercially available components, such as the AMS 2002 or 2006 manufactured by Aptek Microsystems may be used for SLIC 201. While other commercially available components might be used, for purposes of clarity, in the description to follow, reference to the terminal designations of the Aptek Microsystems components will be used.

Driver 203 is connected to loop 16 extending between transient signal elimination circuits 11 and 14 and provides transmit (Xmit) and receive (Rec) signal conductors in a well-known fashion. These conductors are coupled through different poles of switch 202 and thence to the transmit (Xmit) and receive (Rec) terminals of SLIC 201. The tip and ring terminals of SLIC 201 are respectively connected to the tip and ring conductors of loop 16 extending from subscriber telephone 15 to transient signal elimination circuit 14. The switch hook detection terminal (SHD) of SLIC 201 is coupled to the input of control unit 204 and the output of unit 204 is connected to transmit conductor between driver 203 and switch 202. Control unit 205 is coupled to the receive signal conductor running between driver 203 and switch 202 and provides a output which connects to ring trip generator 206 and thence to the ring conductor of loop 16 between transient signal elimination circuit 14 and subscriber telephone 15. Information terminal 13 is connected to loop 16 extending between transient elimination circuits 11 and 14 after first passing through interface 207. This interface, which allows a second information signal to be superimposed over voice communications, includes an automatic balancing circuit advantageously of the type described in the above-referenced copending application along with the circuitry disclosed in U.S. Pat. Nos. 4,493,948 and 4,528,422.

The tip and ring conductors from central office 10 are coupled to transient signal elimination circuit 11. Circuit 11 includes driver 208, switch 209, reverse line interface circuit (RLIC) 210, control units 211 and 212 and interface 213. RLIC 210 is a well-known device that terminates a telephone line from a telephone central office for the purpose of connecting auxiliary equipment that adds features or changes transmission methods.

Commercially available components such as the AMS2039, 2040, 2041 or 2042 manufactured by Aptek Microsystems are suitable. While other similar devices may be used, for the purpose of consistency with the foregoing description, the terminal designations of the Aptek Microsystems devices will be used.

Driver 208 is connected to loop 16 and provides transmit (Xmit) and receive (Rec) conductors which are coupled to the poles of switch 209 and then to the transmit (Xmit) and receive (Rec terminals of RLIC 210, respectively. The tip and ring conductors of loop 16 extending from central office 10 to transient signal elimination circuit 11 are respectively connected to the tip and ring terminals of RLIC 210. Control unit 212 has its input connected to the receive conductor between switch 209 and driver 208 and its is coupled to the seize terminal of RLIC 210. Control unit 211, on the other hand, has its input connected to the reverse (REV) terminal to RLIC 210 and its output joined to the transmit conductor between switch 209 and driver 208. Information terminal 12 is connected to loop 16 between transient signal elimination circuits 11 and 14 after passing through interface 213 which is identical in function and structure to interface 207.

The on-hook to off-hook and off-hook to on-hook signals from subscriber telephone 15 are coupled via loop 16 to SLIC 201 which, in turn, absorbs the troublesome surge or spike signal and generates a switch hook detection signal at its SHD terminal which is supplied to the input of control unit 204. Upon detection of an on-hook to off-hook signal, unit 204 produces a control signal which closes normally-open switch 202 after the troublesome surge or spike has passed. In addition, unit 204 provides an output signal which is coupled to the transmit conductor between driver 203 and switch 202. This output signal is coupled through the loop and is supplied through driver 208 to control unit 212. Upon receipt of this output signal, unit 212 closes switch 209 and couples this output signal to RLIC 210. RLIC 210 then signals central office 10 in conventional fashion that an off-hook condition exists at the subscriber telephone. In addition, the RLIC also absorbs any transient spikes (surges) signals. In similar fashion, an off-hook to on-hook signal is also indicated by the switch hook detection signal from SLIC 201. In response to this signal, control unit 204 opens switch 202 and provides an output signal to control unit 212 which, in turn, opens switch 209. This output signal is also supplied to RLIC 210 which, after receiving the same, signals the central office of the on-hook condition of the subscriber telephone.

It should be noted that transient signal elimination circuits 11 and 14 serve to isolate the subscriber telephone and central office rom the portion of loop 16 between these signal elimination circuits so as to preclude transient signals, occurring when telephone 15 goes off-hook, from interfering with simultaneous information transfer occurring between terminals 12 and 13. In addition, elimination circuits 11 and 14 provide signalling to central office 10 that an on-hook o off-hook condition exists. Advantageously, this action has occurred in a way which is transparent, i.e., unnoticeable, to the information transfer between terminals 12 and 13. Moreover, the on-hook and off-hook conditions of the subscriber telephone are supplied to the central office using signals identical, but for the elimination of the transient signals, to those present in present voice communications. Finally, it will be noted that the information transfer between terminals 12 and 13 can occur simultaneously with the voice communications between subscriber telephone 15 and central office 10 and this information transfer can also take place independently of any voice communication between the subscriber telephone and central office.

Figure 3:
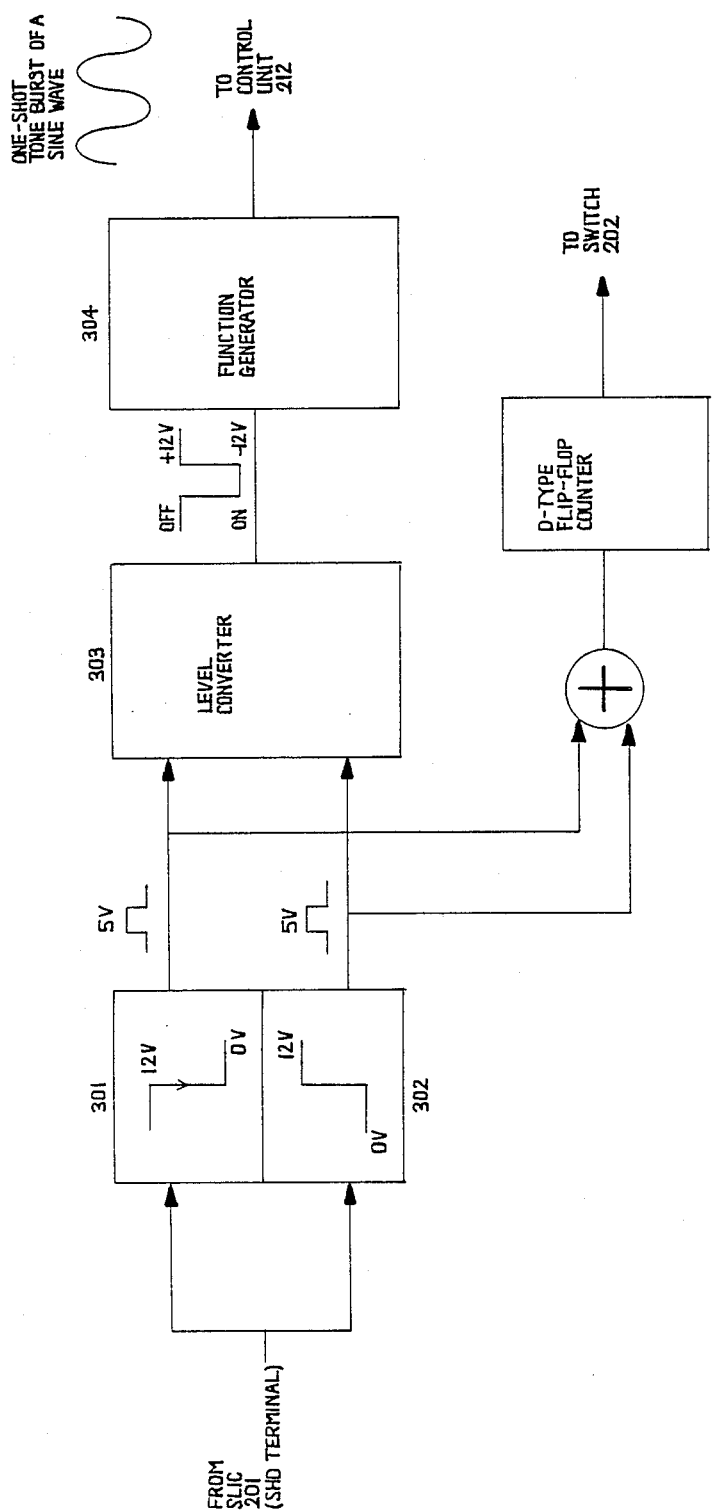
FIG. 3 is a block diagram representation of control unit 204 in FIG. 2.

FIG. 3 shows the circuitry within control unit 204. The switch hook detection signal from SLIC 201 is supplied to two non-retriggerable one-shot circuits 301 and 302. One of these one-shots is responsive to a negative going 12 to 0 volt signal while the other is responsive to a positive going 0 to 12 volt signal. Each of the one-shot circuits produces a 5 volt pulse. Accordingly, the outputs of the one shot circuits will be a 5 volt pulse when the subscriber telephone is going from off-hook to on-hook or off-hook to on-hook. Level converter 303 receives these 5 volt pulses and generates a signal between $+12$ and $-12$ volts which is coupled to function generator 304. A one-shot tone burst of a sine wave is then produced by the function generator which is coupled through drivers 203 and 208 to control unit 212. A filter and peak detector within unit 212 distinguishes the tone burst from transience and closes normally-open switch 209 upon the occurrence of an off-hook condition at subscriber telephone 15 and returns switch 209 to its normally-open condition when an on-hook condition exists at subscriber telephone 15. Control unit 212 also passes the tone burst to RLIC 210 which recognizes this signal after it has been converted to a high or low state, and signals central office 10 that an on-hook or off-hook condition has occurred.

The 5 volts pulses produced by the one-shot circuits are also coupled to summing circuit 305 whose output is coupled to the clock lead of D-type flip-flop 306. Flip-flop 306 configured as a one-bit counter provides the control signal which closes normally-open switch 202 for an off-hook condition at subscriber telephone 15 and opens switch 202 for an on-hook state at this telephone.

To eliminate the transient in a ringing signal which interferes with simultaneous information transfer and voice communications in the same bandwidth, the ringing signal is coupled to RLIC 210 which provides an output signal on its reverse (REV) terminal to control unit 211. Unit 211, in turn, provides an output which is coupled through drivers 208 and 203 to control unit 205. Unit 205 then activates ring trip generator 206 so as to provide a ringing signal to subscriber telephone 15.

Figure 4:
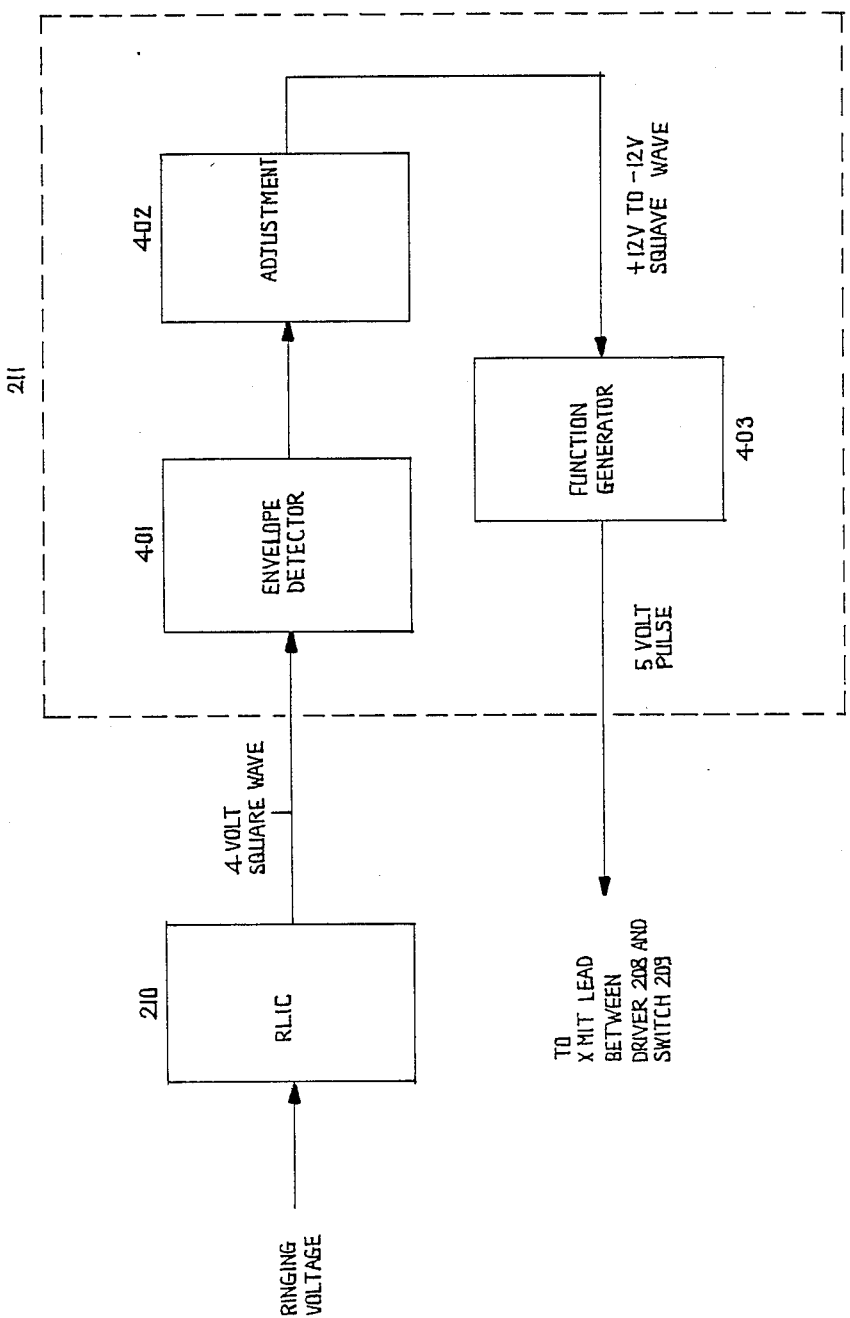
FIG. 4 is a block diagram representation of control unit 211 in FIG. 2.

FIG. 4 shows the signal processing performed in control unit 211 in further detail. The ringing voltage is provided to the RLIC where it is detected and, in response thereto, a 4 volt square wave signal is generated. This square wave is applied to envelope detector 401 which couples the detected signal envelope to level adjustment circuit 402. Within circuit 402, a $+12$ v to $-12$ volt control waveform is produced and this waveform is supplied to function generator 403. Generator 403 provides a sine wave which is 5 volt peak to peak. These signals are short in duration and are described as tone bursts which are coupled to control unit 205. These 5 Volt bursts cause control unit 205 to activate ring trip circuit 206 wherein the ringing signal sans the transient is generated using a 105 volt supply used as a ring generator.

It should, of course, be understood that while the present invention has been disclosed with respect to a particular embodiment, other variations should be apparent to those skilled in the art without departing from the spirit and scope of the invention. First, for example, while information terminal 12 is shown connected to interface 213 this connection could be routed to a position on a data or voice switch or hardwired through central office 10. Such alternative connections would allow information terminal 13 to communicate with other information terminals connected to other local loops. A plurality of information terminals could, therefore, be connected together. Second, while the ringing signal is detected within transient signal elimination circuit 11 and a signal produced which causes regeneration of a "clean" ringing signal i.e. without the transient, in transient elimination circuit 14, a clean ringing signal could be generated within transient signal elimination circuit 14 and thence coupled through transient signal elimination circuit 11 to subscriber telephone 15. Finally, while interfaces 207 and 213 have been shown within circuits 11 and 14, these interfaces could be external to such circuits.

We claim:

1. Apparatus for use in a communications loop connecting a subscriber telephone to a telephone central office, said apparatus comprising
    means for receiving different incoming signals and providing an output signal associated with each of said incoming signals, said receiving means also eliminating an undesirable transient present in a predetermined one of said incoming signals so that none of the output signals include the undesirable transients, and
    circuit path control means responsive to a certain one of said incoming signals received by said receiving means for closing a normally-open first circuit path extending between first and second terminals of said apparatus and reopening said circuit path in response to another one of said incoming signals received by said receiving means.

2. The apparatus of claim 1 wherein said first and second terminals are each a pair of terminals.

3. The apparatus of claim 1 wherein said incoming signals are received on said first and said second terminals.

4. The apparatus of claim 1 wherein said predetermined one of said incoming signals is a ringing signal coupled to said communications loop by said telephone central office and destined for said subscriber telephone and said receiving means eliminates an undesirable transient present in said ringing signal.

5. The apparatus of claim 1 wherein each of said predetermined one of said incoming signals is a signal indicating an off-hook condition at said subscriber telephone and destined for said telephone central office and said receiving means eliminates an undesirable transient present in the off-hook indicating signal.

6. The apparatus of claim 5 wherein said circuit path control means closes said normally-open circuit path after said receiving means receives the off-hook indicating signal.

7. The apparatus of claim 6 wherein said circuit path control means closes said normally-open circuit path after the undesirable transient present in the off-hook indicating signal has expired.

8. The apparatus of claim 6 wherein said incoming signals include a signal indicating an on-hook condition at said subscriber telephone and said circuit path control means returns said circuit path to its normally-open condition in response to the on-hook indicating signal.

9. The apparatus of claim 1 wherein said predetermined one of said incoming signals and said certain one of said incoming signals represent the same information.

10. The apparatus of claim 1 wherein said predetermined one of said incoming signals and said certain one of said incoming signals represent different information.

11. The apparatus of claim 1 wherein said circuit path controlled by said circuit path control means has two conductors.

12. The apparatus of claim 1 wherein said certain one of said incoming signals is associated with a signal indicating an off-hook condition at said subscriber telephone.

13. The apparatus of claim 1 wherein said another one of said incoming signals is associated with a signal indicating an on-hook condition at said subscriber telephone.

14. The apparatus of claim 1 wherein said circuit path controlled by said circuit path control means carries voice signals.

15. The apparatus of claim 1 wherein said receiving means provides a second circuit path between said first and second terminals for carrying signalling information between said central office and said subscriber telephone and said circuit path control means controls the flow of voice information on said first circuit path.

* * * * *